G. L. DOUGLASS.
DEVICE FOR UNLOADING CARGO FROM SHIPS.
APPLICATION FILED FEB. 12, 1917.
1,333,065.
Patented Mar. 9, 1920.
3 SHEETS—SHEET 1.
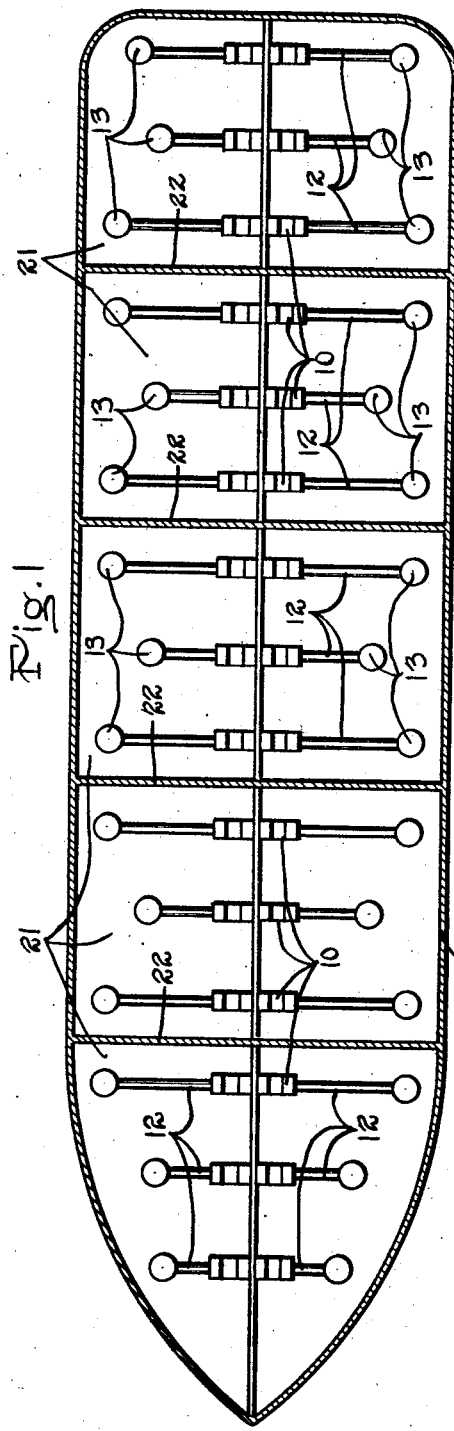
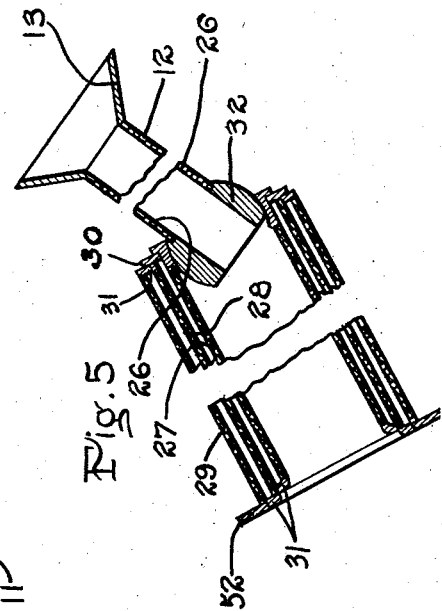
Inventor:
Gibson L. Douglass
By F. G. Whiteley
his Attorney

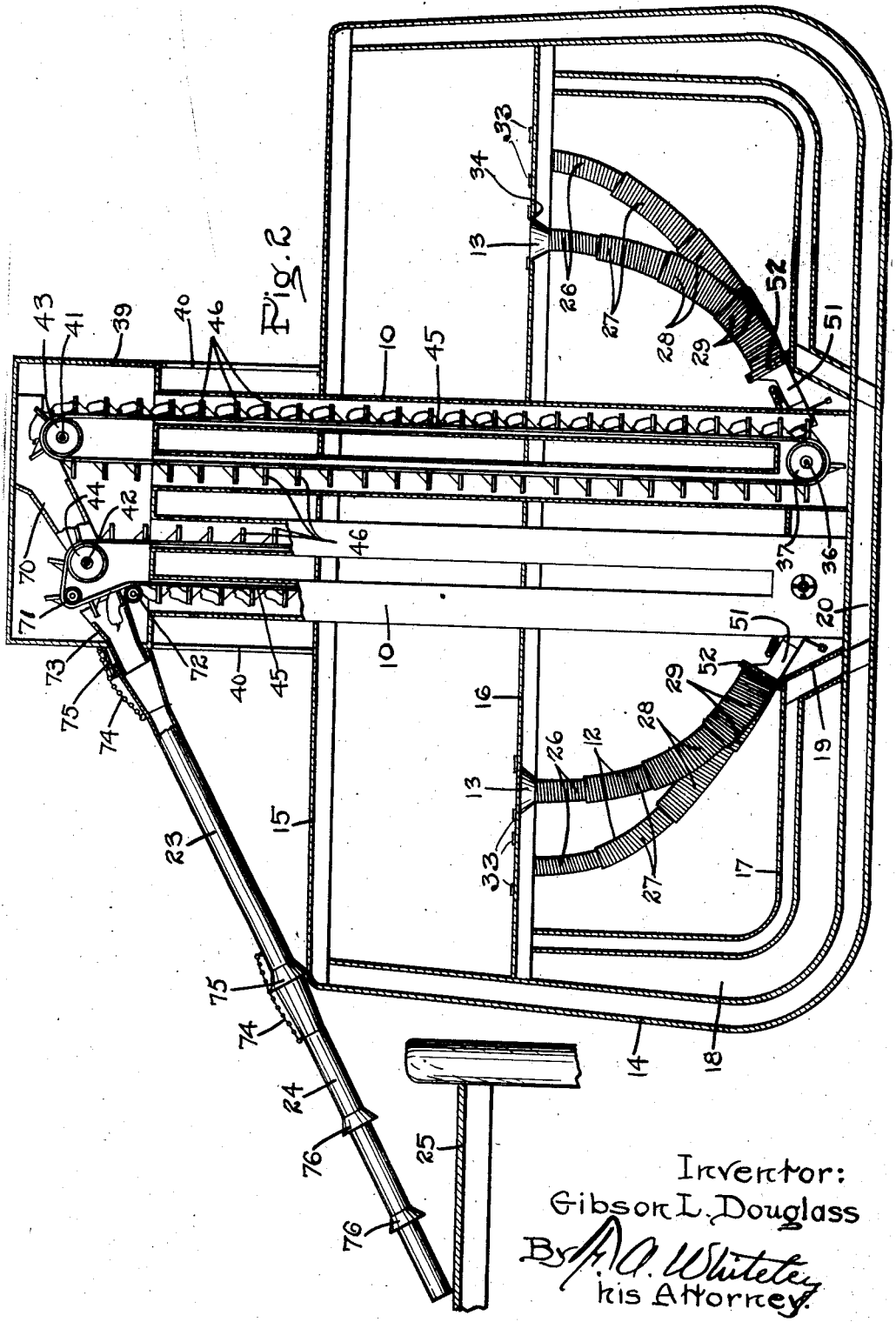

G. L. DOUGLASS.
DEVICE FOR UNLOADING CARGO FROM SHIPS.
APPLICATION FILED FEB. 12, 1917.
1,333,065.
Patented Mar. 9, 1920.
3 SHEETS—SHEET 3.
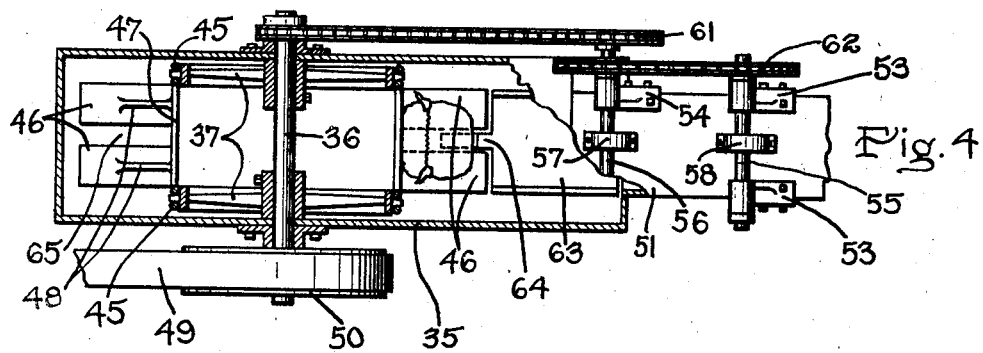
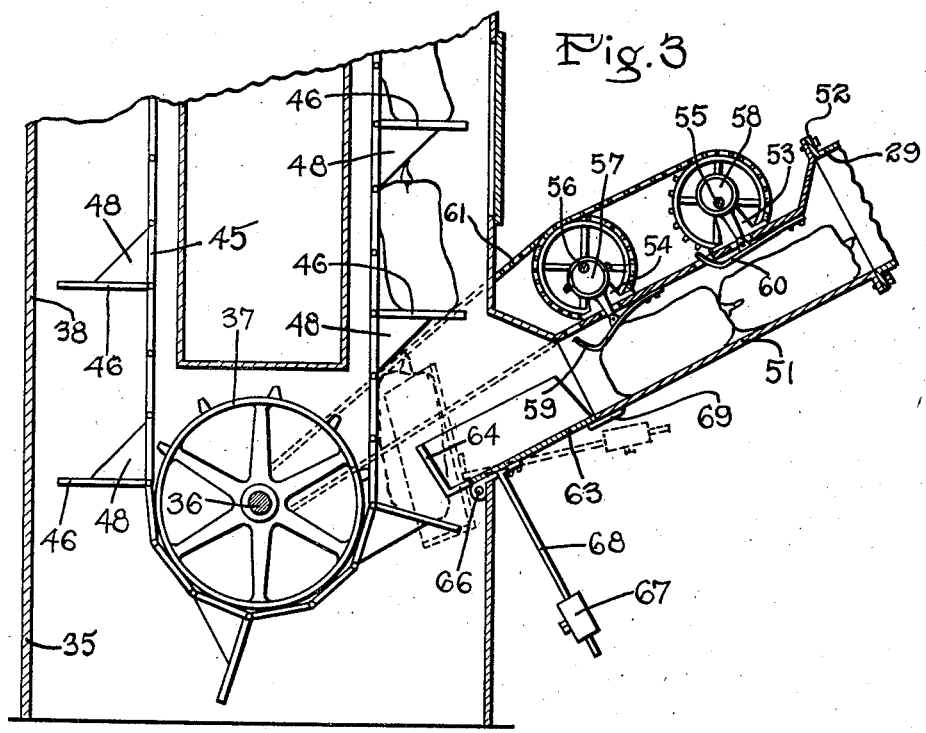
Inventor:
Gibson L. Douglass
By his Attorney.

UNITED STATES PATENT OFFICE.

GIBSON LEMUEL DOUGLASS, OF DULUTH, MINNESOTA.

DEVICE FOR UNLOADING CARGO FROM SHIPS.

1,333,065.      Specification of Letters Patent.      Patented Mar. 9, 1920.

Application filed February 12, 1917. Serial No. 148,092.

*To all whom it may concern:*

Be it known that I, GIBSON L. DOUGLASS, a citizen of the United States, residing at Duluth, in the county of St. Louis and State of Minnesota, have invented certain new and useful Improvements in Devices for Unloading Cargo from Ships, of which the following is a specification.

My invention relates to devices for unloading cargo from ships and has for its object to provide means whereby the cargo of a ship, particularly such as comes in uniform packages, as flour, cement and similar merchandise, may be simultaneously and rapidly unloaded from all parts of the hold and delivered from the ship to the receiving wharf or platform. It is a principal object of my invention to provide a suitable number of elevator mechanisms preferably positioned along the center of the ship and adapted to receive cargo from the lower hold and also the between-decks cargo space; and to provide in conjunction with said elevators a multiplicity of telescopic conveyer spouts. These spouts in fully extended position will pass through the hold and to the tank top or skin of the lower deck. The material to be unloaded may be transferred through the conveyer spouts from between decks to the elevators and thence from the ship to the wharf. After the between-decks cargo has been unloaded, either through the conveyers before mentioned or directly by means of the elevator, the hold is entirely unloaded by passing the cargo into the mouths of the delivery spouts, whence it moves by gravity to the elevators, where means are provided for taking the cargo from a spout one article or sack at a time and automatically discharging it to means for conveying from the ship to the wharf. In unloading the hold the stevedores will always be working in such manner as to deliver the sacks or packages directly into the conveyer tubes with the mouth thereof positioned at the level of the cargo in whatever stage of unloading it may be. This is permitted by the fact that the delivery tubes or chutes are flexible and collapsible, telescoping downwardly as the cargo level is lowered. There are also large numbers of such delivery chutes scattered throughout the hold, all of which may be simultaneously operated so that the cargo can be unloaded with the utmost despatch. A cargo which under present conditions would take a day's time to unload can be unloaded with my mechanism in a few hours, thus enormously increasing the carrying and earning capacity of the ship. A special object of my invention is to provide a device for receiving the sacks or other articles from the telescopic conveyer chute and delivering them one at a time in timed relation to the movement of the receiving members of the elevators, so that each of said receiving members will have discharged thereon one only of the sacks or articles and so that said sacks or articles will be positioned upright, or in the desired manner for rendering the construction most effective in unloading the particular merchandise comprising the cargo.

The full objects and advantages of my invention will appear in connection with the detailed description thereof and are particularly pointed out in the claims.

In the drawings, illustrating the application of my invention in one form,—

Figure 1 is a diagrammatic plan view of a ship showing the installation of my unloading system. Fig. 2 is a transverse vertical sectional view of a ship having my invention applied thereto drawn to a larger scale. Fig. 3 is an enlarged sectional detail view of one of the elevator boots shown in Fig. 2 with the releasing mechanism applied thereto. Fig. 4 is a horizontal sectional view of the parts shown in Fig. 3. Fig. 5 is a sectional view of the receiving spout shown in Fig. 2.

In the drawings a ship 11 of ordinary construction is shown which consists of an outer shell 14 and two decks 15 and 16 forming ordinary holds or loading spaces. Between the outer shell 14 and an inner wall 17 within the hold is formed a hollow space 18 in which water may be pumped to be used as a ballast when the boat is unloaded. This inner wall is depressed at 19 to coincide with the bottom 20 of the boat, which provides a space for the installation of my invention, as will later appear. The loading space of the boat is divided into a number of compartments 21 by transverse walls 22, as is clearly shown in Fig. 1.

In the ordinary methods used in unloading ships of cargo contained therein which is in the form of a parcel, either a sack, box or barrel, the same is usually elevated and then conveyed on trucks by hand to the desired location. With my invention the parcels are merely deposited in the respective receiving spouts and automatically discharged at a distant point on the dock or wharf in the location desired. The result I accomplish by arranging a number of elevators 10 along the center line of the ship 11, as is clearly shown in Figs. 1 and 2. I employ six elevators for each of the compartments 21, preferably arranging three on each side of the center line of the ship. To the boots of these elevators are connected flexible spouts 12 provided with hoppers 13 which extend upward and may be passed through apertures 34 in the deck 16 and secured to the same on a level therewith. The heads of elevators 10 are raised somewhat above the level of spar deck 15 and are adapted to discharge into delivery spouts 23 and 24 which deliver the parcels to a dock 25 or to any locality desired.

The delivery spouts 12, as are clearly shown in Fig. 5, comprise a number of sections 26, 27, 28 and 29 which are each constructed to be flexible and are telescopingly arranged to be extended or contracted at will. These sections are formed with annular lips 30 and 31 which engage each other at the extreme positions of the sections to terminate the telescopic motion thereof. The upper section 26 is formed with a ball-and-socket joint 32 so that the same is capable of extensive movement in the extended position. This section is weighted on the bottom so as to cause the spout to readily collapse. This section also carries the receiving hopper 13, previously referred to, which may have pivoted to it a number of hooks 33 shown in Fig. 2 adapted to be hooked over the edge of the floor of deck 16 to support the delivery spout in place before the ship is loaded. In use the various spouts 12 are supported from the deck 16 and the cargo loaded in and about the same below said deck, excepting for a short distance around hoppers 13. Additional cargo is then loaded on said deck, leaving an open passageway from the top of the mass of cargo to the opening in said spouts. When it is desired to unload, the sacks or parcels are thrown into this opening and drop into hoppers 13 and through spouts 12 to the various elevators, where they are automatically delivered to the wharf or dock. As soon as deck 16 has been cleared of cargo, the hooks 33 are disengaged and sections 26 of the spouts 12 are partially retracted within the same so as to give access to the cargo about said spouts in the lower hold. Apertures 34 through deck 16 are arranged, as shown in Fig. 1 or otherwise, to enable the cargo to be unloaded from this deck with the least possible handling and are constructed large enough so that a man may have access through the same to the cargo within the lower hold. In unloading the cargo in the lower hold the parcels are again thrown into the hopper 13 and delivered to the wharf as before specified. As the upper level of the cargo becomes lowered the various sections of the spouts 12 are successively telescoped or retracted so as to maintain the hoppers 13 at substantially the level of the same. In this manner it becomes unnecessary to lift the cargo, as the same can be shoved or slid to the mouths and then dropped into the spouts. By means of the ball-and-socket arrangement 32 and the flexibility of the free portion of section 26, said section can be directed to extreme corners of the compartments 21 so as to minimize the amount of handling of the cargo. It will be noticed in Fig. 1 that the various openings 34 in the deck are so arranged that the outer spouts take care of the cargo piled in the corners of the compartments, while the central spout handles all the cargo toward the center of the compartment. With this arrangement the spouts do not have to be moved any great amount to unload the cargo.

The elevators 10 may be constructed in any ordinary manner. A number of elevator boots 35 each support a shaft 36 on which is mounted a pair of sprocket wheels 37. From the boots 35 extend upwardly elevator legs 38 which connect with a common housing 39 supported on framework 40 from deck 15 above the level of the same. This latter housing serves as an elevator head for all of the elevators and contains the discharge mechanism by which the cargo is delivered to the delivery spouts 23 and 24. Within housing 39 are journaled pairs of shafts 41 and 42 which carry sprocket wheels 43 and 44, similar to the sprocket wheels 37. Within the boots 35 of the elevators pairs of endless chains 45 pass about these sprockets within the legs 38 and have secured to them carrier members 46, as is clearly shown in Fig. 2. Each of the carriers 46 is formed with a back 47 which is directly attached to chains 45 and which is braced to said back by a rib 48. As the sacks or parcels leave the spouts 12 the same are deposited upon the carrier members 46 and elevated to the housing 39, where they are discharged is a manner to be later explained. The elevators may be driven by belts 49 which pass about pulleys 50 secured to shafts 36 in the boots 35, or the same may be driven directly through the shafts 41 and 42. If desired, the drive shafts, whether they be the upper or lower shafts, may be made to extend through all of the elevators for one compartment of the boat, thereby simultaneously driving all of said elevators on one side of the compartment. Or the same may be made to individually drive each elevator.

The device for loading the sacks or parcels upon the carrier members 46 of elevators 10 is best shown in Figs. 3 and 4. To the boot 35 is secured an inclined spout 51 which is formed with a flange 52 by means of which the lower section 29 of spout 12 can be attached thereto. The lower floor of spout 51 is made in alinement with the floor of section 29 so that the parcels as they pass from said section will slide smoothly along the same. In the upper portion of this spout are mounted two flexible engaging members 59 and 60 which are adapted to engage the sacks or parcels by direct contact to arrest the same in their motion toward the elevator carriers. These members are preferably formed of a resilient material, being secured to the under side of the upper wall of said spout, and are alternately caused to be successively raised and depressed by a pair of eccentrics 57 and 58 driven as follows. Upon the upper surface of spout 51 are mounted bearings 53 and 54 in which are journaled two transverse shafts 55 and 56. These shafts carry the eccentrics 57 and 58. Shaft 56 is driven from the shaft 36 of the elevator proper by means of a chain 61, and shaft 55 is driven at the same speed as shaft 56 from said shaft by means of another chain 62. The rate of rotation of shafts 55 and 56 is such that one sack will be released for each carrier member 46 which is caused to pass the spout 51. It will be noted that eccentrics 57 and 58 are so positioned that one of the engaging members is operative while the other is inoperative. In actual construction it is found necessary to allow a little play in the joint connecting the eccentrics with the engaging members so that the two sacks acted upon will not be simultaneously released when member 59 is raised. By constructing these members of resilient material any parcel which passes through spout 51 will be arrested from motion by engagement of said members, since the same will yield and thereby engage any shape or size of article.

Extending partially within the elevator boot 35, and forming a continuation of the spout 51, is pivoted near its lower end at 66 a trough-like member 63 which is adapted to be swung from its normal position, shown in full lines in Fig. 3, to its other position as shown in dotted lines in Fig. 3. This trough is formed at its end with an upstanding arm 64 which the sacks or parcels from the spout 51 strike as the same descend upon this trough. Carrier members 46 are arranged with a central aperture 65 through which the arm 64 may pass without obstruction as the elevator travels. The forward end of the member 63 is cut away at two corners at each side of the arm 64 to permit passage of the carrier arms 46. The operation of the trough member 63 becomes evident from the drawing. As soon as a sack is released and strikes arm 64 the momentum of the sack carries said trough about its pivot 66, swinging the same with the sack thereon to the dotted position shown in Fig. 3. The elevator chains 45 are so timed that the carrier members 46 will be in a position to receive the sacks as soon as the same are delivered by the trough member 63. In this manner each sack or parcel is made to stand on end on the respective carrier, thus uniformly loading the elevator and preventing possible falling off of the parcels. To return member 63 to its normal position a counterweight 67 is employed which is adjustably mounted on an arm 68 attached to the under side thereof. A stop 69 secured to spout 51 limits the motion of said trough, bringing it in alinement therewith.

The devices for discharging the parcels or sacks from the respective elevators can best be seen in Fig. 2. It becomes evident that two different devices must be used for this purpose, as the two sets of elevators employed operate in opposite directions and are still required to deliver the cargo on one side of the boat. The elevators controlled by shafts 41 are adapted to discharge the parcels overhead by centrifugal force in the ordinary manner and said parcels are caught by a receiving-head 70 which is directly connected with one of the spouts 23. The elevators associated with shafts 42 operate, however, upon a somewhat different principle. In this case two sets of idlers 71 and 72 are employed in proximity to the upper supporting sprockets 44 which are arranged so as to cause the chains 45 to follow an outwardly-inclined path for a short distance at the upper course of travel of the same. This makes the carrier supports 46 take a downwardly-sloping position during this travel which causes the parcels to slide off the same or to drop by gravity from the same into a receiving-head 73 which is connected to one of the spouts 23. Due to the fact that the elevators controlled by shaft 41 are farther from the point of discharge than those controlled by shafts 42, said first-named shaft is positioned above the second, which causes the parcels carried thereby to be elevated to a greater height. Receiving-head 70 for this device must also be slightly offset to clear the corresponding elevator which is positioned directly opposite it.

The construction and manipulation of delivery spouts 23 and 24 is of little importance so long as rain is prevented from entering them and so long as the unions between the same and the receiving-heads 70 and 73 are flexible enough to permit the ship to rock without injury thereto. I show these sections connected together and to the said receiving spouts by means of chains 74 which prevent the same from pulling apart and yet give them all desirable lateral movement. I further employ sloping hoods 75 which cover the joints, and also flanges 76 which intercept the rain before it reaches the discharge ends of said spouts. This arrangement also permits delivery spouts 23 and 24 to be moved to different positions on the dock 25 without affecting the operation of the system.

The advantages of my invention are manifest. The cargo can be unloaded from the boat in much less time and at a greatly reduced expense than by ordinary methods. The operation of the device is positive and injury to sacks or containers is less apt to happen.

I claim:

1. An unloading device for ships comprising a collapsible chute positioned in the cargo and having a receiving mouth held by the cargo at the level thereof, and means for conveying packages of cargo from their point of delivery at the bottom of said chute to a point of discharge sufficiently elevated above the platform of the wharf.

2. An unloading device for ships comprising a collapsible chute positioned in the cargo and having a receiving mouth held by the cargo at the level thereof, means for conveying packages of cargo from their point of delivery at the bottom of said chute to a point of discharge sufficiently elevated above the platform of the wharf, and means for receiving said packages from said delivering means and permitting their automatic discharge from the vessel to the wharf.

3. An unloading device for ships comprising a collapsible chute positioned in and held by the cargo, and means for conveying cargo packages from the discharge end of said chute and delivering said packages outside of the ship.

4. Means for unloading ships comprising an elevator centrally positioned in the ship and adapted to receive cargo packages and carrying them to a point above the top deck for delivery from the ship to the wharf, and a collapsible chute positioned in the cargo for delivering packages to the lower end of the elevator.

5. Means for unloading ships comprising an elevator centrally positioned in the ship and adapted to receive cargo packages and carry them to a point above the top deck for delivery from the ship to the wharf, and a collapsible chute held positioned in the cargo with the mouth thereof at the cargo level for delivering said packages to the lower end of the elevator.

6. Means for unloading ships comprising an elevator centrally positioned in the ship and adapted to receive cargo packages and carry them to a point above the top deck for delivery from the ship to the wharf, and a multiplicity of collapsible chutes positioned in the cargo for delivering the packages to the lower end of the elevator.

7. Means for unloading ships comprising a series of elevators positioned along the center line of the ship and adapted to deliver packages of cargo from the bottom of the hold to a point above the upper deck whence said packages may be discharged by gravity from the ship to the wharf, and a plurality of collapsible chutes positioned in the cargo at various points throughout the length of the ship and adapted to deliver packages of cargo to the lower point of said elevators.

8. Means for unloading ships comprising a series of elevators positioned along the center line of the ship and adapted to deliver packages of cargo from the bottom of the hold to a point above the upper deck whence said packages may be discharged by gravity from the ship to the wharf, and a plurality of collapsible chutes positioned in the cargo at various points throughout the length of the ship and adapted to deliver packages of cargo to the lower point of said elevators, each of said chutes comprising a fixed bottom member and a funnel-mouthed top member held by the cargo at the level thereof.

9. An unloading device for ships comprising a chute formed of a multiplicity of telescoping sections, the bottom section being fixed in position and the top section including a receiving mouth held by the cargo at the level thereof, and means for receiving cargo packages from said fixed member and for conveying said packages to a point of discharge sufficiently elevated above the platform of the wharf.

10. An unloading device for ships comprising a chute formed of a multiplicity of telescoping sections, the bottom section being fixed in position and the top section including a receiving mouth held by the cargo at the level thereof, an elevator for conveying packages to a point of discharge sufficiently elevated above the platform of the wharf, and means between the bottom of the elevator and the end of the fixed section for transferring packages one at a time to the elevator.

11. An unloading device for ships comprising a chute formed of a multiplicity of telescoping sections, the bottom section being fixed in position and the top section including a receiving mouth held by the cargo at the level thereof, an endless conveyer comprising a multiplicity of carrier arms movable in proximity to the lower end of the fixed section, and means between said elevator and fixed section for automatically delivering packages of cargo one at a time to the successive carrier arms of the conveyer.

12. An unloading device for ships comprising a chute formed of a multiplicity of telescoping sections, the bottom section being fixed in position and the top section including a receiving mouth held by the cargo at the level thereof, an endless conveyer comprising a multiplicity of carrier arms movable in proximity to the lower end of the fixed section, and means including an oscillating shifter for automatically delivering packages of cargo from the chute successively to each of said carrier arms.

13. Means for delivering cargo from ships comprising an endless conveyer having a multiplicity of carrier arms, a hopper adjacent said conveyer adapted to receive a multiplicity of packages of cargo such as loaded sacks, detents extending within the hopper and adapted alternately to restrain and release the advanced sack and the sack immediately behind the same, means for actuating said detents in timed relation to the movement of the carrier arms for permitting successive delivery of sacks one at a time to each set of carrier arms, and a shifter box pivoted in front of the hopper and coöperating therewith and actuated by the movement of a sack thereinto to position the sack in upright inwardly-leaning position upon the carrier arms.

14. Means for delivering cargo from ships comprising an endless conveyer having a multiplicity of carrier arms, a collapsible chute positioned in the cargo, a hopper adjacent the lower end of the conveyer and adapted to receive packages of cargo such as loaded sacks from the chute, and to contain a plurality of said sacks, means for releasing said sacks one at a time in timed relation to the movement of the carrier arms to permit delivery of the sacks successively to said carrier arms, and means for positioning the sacks upon the carrier arms as the same are delivered.

15. Means for delivering cargo from ships comprising an endless conveyer having a multiplicity of carrier arms, a collapsible chute positioned in the cargo, a hopper adjacent the lower end of the conveyer and adapted to receive packages of cargo such as loaded sacks from the chute, and means extending within the hopper and operative upon the sacks so as alternately to restrain and release the advanced sack and the sack immediately behind the same to permit the delivery of the sacks successively and one at a time to the carrier arms.

16. Means for delivering cargo from ships comprising an endless conveyer having a multiplicity of carrier arms, a collapsible chute positioned in the cargo, a hopper adjacent the lower end of the conveyer and adapted to receive packages of cargo such as loaded sacks from the chute, means extending within the hopper and operative upon the sacks so as alternately to restrain and release the advanced sack and the sack immediately behind the same to permit the delivery of the sacks successively and one at a time to the carrier arms, and means for positioning the sacks upon the carrier arms as the sacks are delivered thereto.

17. Means for unloading ships comprising an endless conveyer having a multiplicity of carrier arms, and means for delivering sacks to said carrier arms including a pivoted shifter box adapted to be actuated by the impact of a sack moving into the same to position the sack upon a set of carrier arms.

18. Means for unloading ships comprising an endless conveyer having a multiplicity of carrier arms, and means for delivering sacks to said carrier arms including a pivoted shifter box adapted to be actuated by the impact of a sack moving into the same to position the sack upon a set of carrier arms, said shifter box being cut away at two corners in the forward part thereof to permit the passage of the carrier arms.

19. Means for unloading ships comprising an endless conveyer having a multiplicity of carrier arms, means for delivering sacks to said carrier arms including a pivoted shifter box adapted to be actuated by the impact of a sack moving into the same to position the sack upon a set of carrier arms, and a weighted arm secured to said shifter box for restoring it to initial position.

20. Means for unloading ships comprising a pair of endless conveyers extending vertically side by side on a line transverse to the ship from the bottom of the hold to a point above the upper deck, the tops of said conveyers being at different elevations, a chute extending from the top of each conveyer to a point outside of the ship upon the wharf, means for delivering packages of cargo such as sacks successively upon the carrier arms of each conveyer, means for causing one of the conveyers to deliver the sacks over the top of said conveyer into the chute, and means for causing the other of said conveyers to deliver the sacks from a side of the conveyer into the chute.

In testimony whereof I affix my signature.

GIBSON LEMUEL DOUGLASS.